Jan. 12, 1926.
A. B. MYERS
1,569,843
VALVE
Filed March 3, 1924
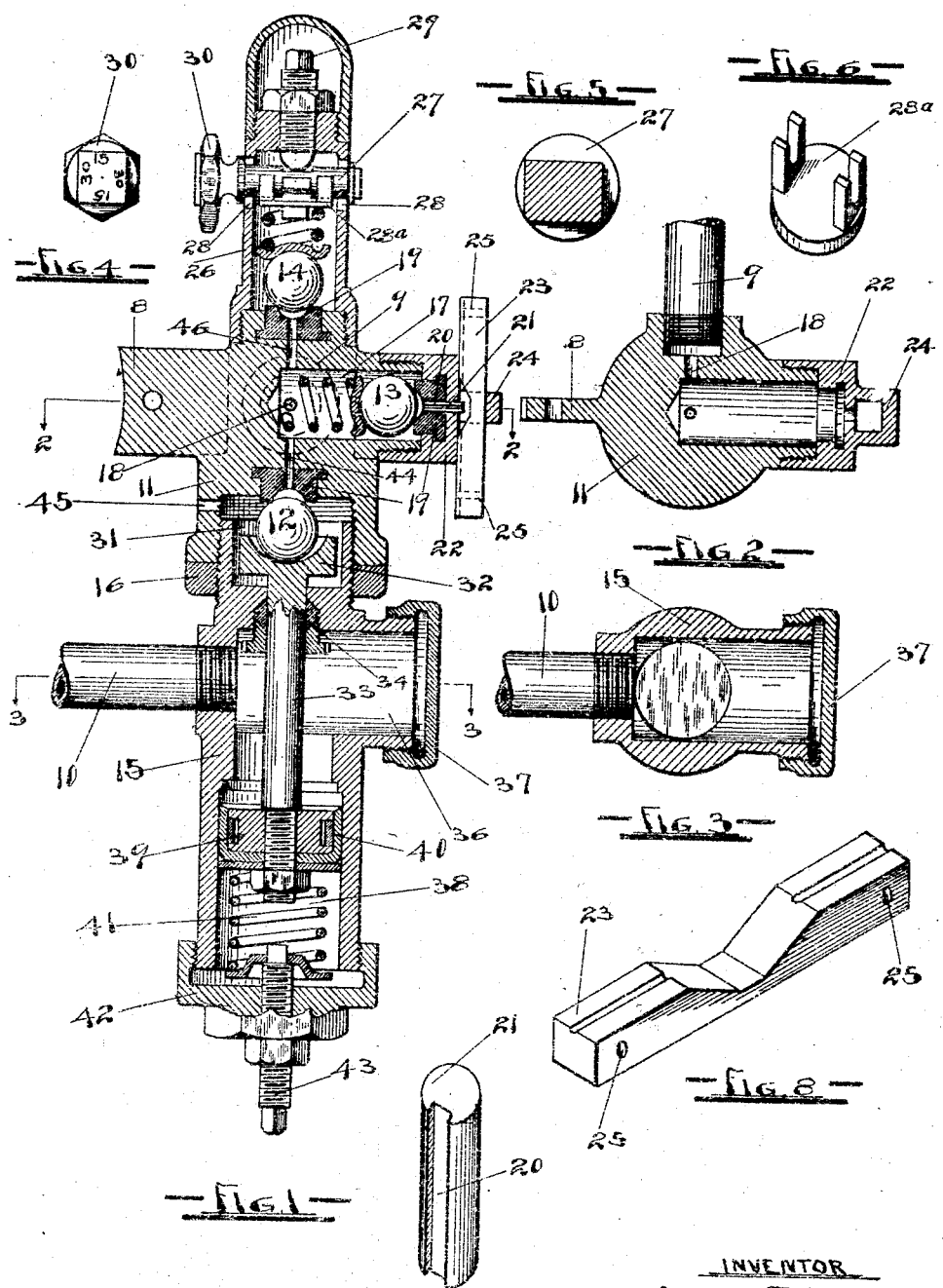
INVENTOR
ALFRED B. MYERS
By C. F. Blake
ATTY.

Patented Jan. 12, 1926.

1,569,843

UNITED STATES PATENT OFFICE.

ALFRED B. MYERS, OF PORTLAND, OREGON.

VALVE.

Application filed March 3, 1924. Serial No. 696,702.

*To all whom it may concern:*

Be it known that I, ALFRED B. MYERS, a citizen of the United States, residing at Portland, county of Multnomah, State of Oregon, have invented certain new and useful Improvements in Valves, of which the following is a specification.

My invention relates to valves in general, and particularly to such valves as are used for retaining valves upon air brake systems, and is a further development of and improvement upon the valve described in U. S. Patent No. 1,312,453 issued to me August 5, 1919. In that patent there was disclosed a construction wherein the valve was held closed by compressed air from a train or service pipe under control of the engineer by means of a valve in the locomotive cab, and was opened by springs when the air pressure was relieved by the engineer. One object of the present invention is to reverse that operation and provide a valve that is held closed by springs, and opened by compressed air controlled by the engineer. A further object is to provide a retaining valve that may be operated and controlled in three independent ways, by the engineer from the locomotive cab, by a train man by manual operation, or by a safety valve set to a predetermined pressure. I attain these objects, and other desirable results hereinafter described, by means of the construction illustrated in the accompanying drawing, which is a part of this application for Letters Patent, like characters of reference indicating like parts throughout the several views thereof, and in which:

Fig. 1 is a sectional elevation of my valve.

Figs. 2 and 3 are sections upon lines 2—2 and 3—3 of Fig. 1 respectively.

Fig. 4 is an elevation of the safety valve setting disk.

Fig. 5 is a transverse section through the central portion of the safety valve adjusting member.

Fig. 6 is a perspective view of the safety valve spring perch.

Fig. 7 is a perspective view of the release cock stem.

Fig. 8 is a perspective view of the release cock operating bar.

My valve is mounted upon the brake cylinder head of an air brake system, conveniently by the lug 8, and is connected into the exhaust of the usual triple valve of the system by pipe 9, and to a train or service pipe 10 leading to a controlling valve in the engineer's cab in the locomotive.

The body of my valve consists of two parts, the upper part 11 being connected to the pipe 9 and containing the air controlled valve 12, the manually controlled valve 13, and the safety valve 14. The lower part 15 contains the mechanism that operates the air operated valve 12, and is connected to the pipe 10. The two parts 11 and 15 are threaded together and locked by a lock nut 16, and thus the two parts may be turned upon their common axis into any desired angular relationship.

It is well known that when the brakes are set they gradually become released because of leakage through the exhaust of the triple valve, and it is the function of my valve to prevent this leakage, and thus to hold the brakes set indefinitely. Therefore my valve is connected to the exhaust of the triple valve by the pipe 9, and any leakage of the triple valve must pass into the chamber 17 of my valve by way of port 18. From the chamber 17 the air has three ways of exhaust; past the valve 12 operated by the engineer; past the valve 13 manually operated by a train man; or past the automatic safety valve 14 set to a predetermined pressure. Each of said valves is supplied with a seat 19 of elastic or yieldable material such as rubber or the like, and each of the valves 13 and 14 is seated by suitable springs, as shown in Fig. 1.

The exhaust from the valve 13, when it is opened, is through the port 20 of the stem 21, shown in detail in Fig. 6.

Said stem projects from the cap 22 which closes the chamber 17 to coact with a cam shaped bar 23 shown in detail in Fig. 7. Said bar slides within a suitable guide 24 upon the cap 22, and as the camlike portions of said bar contact with the stem 21 said stem is forced inward and unseats the valve 13, thus allowing the air to exhaust from the chamber 17 by way of the port 20 in said stem 21. The bar 23 is operated in any suitable manner, preferably by rods (not shown) hooked into orifices 25 in said bar, and carried to convenient locations for operation by a train man.

The safety valve 14 is contained within a casing 26 mounted upon the upper part 11 of my device, and mechanism for setting the said valve to open at any desired predetermined pressure is provided as follows. An adjusting member 27 is mounted transversely of the casing 26 in slots 28 therein, so that said member can move longitudinally of said casing and also rotate. The spring that seats the valve 14 is mounted at one end thereof against said member 27 by means of a suitable spring washer 28ᵃ, shown in detail in Fig. 6, said washer having suitable projections to engage with the spring and with the member 27. An adjusting screw 29 is threaded into the upper end of the casing 26 and adapted to bear upon the member 27, as shown in Fig. 1. At the point where said adjusting screw contacts with the member 27 said member is provided with a plurality of flat sides, as shown in detail in Fig. 5, upon one of which sides the screw 29 rests. Said flat sides are constructed at various distances from the axis of the member 27, so that, with any certain setting of the screw 29 the tension of the coacting spring may be varied by rotating the member 27 until the desired flat side is brought into coaction with the screw 29. For the purpose of rotating said member 27 I provide it with a suitable knob 30, and stamped upon said knob are figures indicating the pressure at which the safety valve will exhaust when the corresponding flat side of the member 27 is in contact with the screw 29.

The valve 12 is operated by compressed air from the engineer's cab of the locomotive by means of the following described mechanism contained within the part 15 of my device. The lower portion of part 11 and the upper portion of part 15 form together a chamber 31 containing the valve 12, and also containing a piston 32 contacting with said valve and normally holding said valve seated. A stem 33 projects downward from said piston through a stuffing box 34 which seals the chamber 31, as shown in Fig. 1. The gland of said stuffing box is disposed within a chamber 36, which chamber contains the gland of said stuffing box, and is connected to the train pipe by means of pipe 10, and is closed by a cap 37. The piston stem 33 projects downward through the chamber 36 into a cylindrical chamber 38 in the lower end of the part 15, and terminates within said chamber 38 with a piston 39 mounted thereupon, which piston is made air tight within the chamber 38 by means of the usual cup member 40. A spring 41 is disposed within the chamber 38 beneath the piston 39 and the cap 42 to force the piston 32 upward and thus seat the valve 12. An adjusting screw 43 is provided, threaded into the cap 42, for the purpose of adjusting the tension of the spring 41.

The operation of my device is as follows:
Let it be assumed that the brakes have been set by the engineer in the usual manner, and that it is desired to keep them set for an indefinite period. This my device will accomplish at its normal setting with all the valves 12, 13 and 14 seated and closed, as shown in Fig. 1, because with this condition no leakage of the exhaust of the triple valve can occur, since any such leakage would have to pass through the chamber 17 of my device and exhaust therefrom, and such exhaust is rendered impossible by the three valves being seated upon their respective yieldable seats 19.

If then, when the brakes are set, the engineer wishes to release the brakes, he turns compressed air into the pipe 10 by means of a suitable valve located in his locomotive cab, and such compressed air depresses the piston 39 and thus the piston 32, and thus unseats the valve 12, which allows the exhaust from the triple valve of the air brake system to escape through the pipe 9, port 18 and chamber 17, port 44, chamber 31 and port 45 to the atmosphere, thus releasing the set brakes.

If a train man desires to release the set brakes he slides the bar 23 to move the stem 24 inward and thus unseat the valve 13. Thus as before described the exhaust from the triple valve is allowed to escape to the atmosphere by way of the port 20 in the stem 21.

If it is desired to hold the brakes set with a predetermined pressure the safety valve is set for such pressure by means of the adjusting member 27, whereupon the valve 14 will unseat itself at such pressure and allow the exhaust from the triple valve to escape to the atmosphere by way of the port 46 and the slots 28 in the casing 26.

By means of this construction it is obvious that the retaining of the brakes in set position is not dependent upon holding compressed air within the device, but on the contrary should an accident open the train pipe 10 to the atmosphere such accident would not release the brakes because the valve 12 is held seated by the spring 41.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. In a valve: a casing consisting of two parts and means to join said parts together;

a closure upon the bottom of the lower of said casing parts; a valve controlling an outlet port in said casing; a piston plunger adapted to coact with said valve to operate the latter; pneumatically operated mechanism for operating said plunger; a spring to hold said plunger in position wherein said valve is closed; a chamber with an inlet port formed within said casing, said valve controlled outlet port communicating with said chamber.

2. In a valve for an air brake system: a casing having an inlet port; and a plurality of exhaust valves surrounding said port, one of said valves being an automatic safety valve, another of said valves being adapted for manual operation, and another of said valves being adapted for pneumatic operation.

3. In a valve: a casing having an inlet port and a plurality of exhaust ports; a safety valve controlling one of said exhaust ports; a manually operated valve controlling another of said exhaust ports; and a pneumatically operated valve controlling another of said exhaust ports.

4. An air brake retaining valve mountable upon the exhaust of a triple valve and controlled by a trinity of exhaust valves, each independent of the others.

5. In a valve: a casing containing a trinity of exhaust valves and having an intake port common to all said valves.

6. In a valve: a valve body having a safety valve, a manually operated valve, and a pneumatically operated valve; an exhaust port for each of said valves; and an intake common to said valves.

In witness whereof I claim the foregoing as my own I hereunto affix my signature at Portland, county of Multnomah, State of Oregon, this 18th day of July, 1923.

ALFRED B. MYERS.